July 26, 1960 W. M. McMILLAN ET AL 2,946,985
MAGNETIC CORE BUFFER STORAGE
Filed Aug. 12, 1955 6 Sheets-Sheet 1

INVENTORS
WILMUR M. McMILLAN
RICHARD W. LOWRIE
EDWARD J. RASER
BY
Theodore C. Wood
AGENT

MAGNETIC CORE BUFFER STORAGE

Filed Aug. 12, 1955 6 Sheets-Sheet 2

INVENTORS
WILMUR M. MCMILLAN
RICHARD W. LOWRIE
EDWARD J. RASER
BY
Theodore C. Wood
AGENT INVENTORS
WILMUR M. MCMILLAN
RICHARD W. LOWRIE
EDWARD J. RASER
BY
Theodore C. Wood
AGENT July 26, 1960 W. M. McMILLAN ET AL 2,946,985

MAGNETIC CORE BUFFER STORAGE

Filed Aug. 12, 1955 6 Sheets-Sheet 4

INVENTORS
WILMUR M. MCMILLAN
RICHARD W. LOWRIE
EDWARD J. RASER

BY Theodore C. Wood
AGENT

INVENTORS
WILMUR M. MC MILLAN
RICHARD W. LOWRIE
EDWARD J. RASER
BY Theodore C. Wood
AGENT July 26, 1960 W. M. McMILLAN ET AL 2,946,985

MAGNETIC CORE BUFFER STORAGE

Filed Aug. 12, 1955 6 Sheets-Sheet 6

INVENTORS
WILMUR M. MCMILLAN
RICHARD W. LOWRIE
EDWARD J. RASER

BY

Theodore C. Wood

AGENT

United States Patent Office 2,946,985

Patented July 26, 1960

2,946,985

MAGNETIC CORE BUFFER STORAGE

Wilmur M. McMillan, Wappingers Falls, and Richard W. Lowrie, Poughkeepsie, N.Y., and Edward J. Raser, Concord, Mass., assignors to International Business Machines Corporation, New York, N.Y., a corporation of New York Filed Aug. 12, 1955, Ser. No. 527,911

6 Claims. (Cl. 340—174)

This invention relates to signal storage equipment and more particularly to signal storage equipment of the magnetic core type.

In certain electronic computer applications it is desirable to provide for temporary storage of parallel signals which are to be entered into the computer and those signals take a long time to be initiated as compared to the time that it takes to transfer those signals. These signals may be either signals representative of data to be processed by the computer or signals representative of instructions, that is, signals indicative of operations to be performed by the computer. In arrangements of this type heretofore, the writing operation into the temporary storage and the reading operation from the temporary storage into the computer were synchronized with respect to each other in some suitable way. In certain computer applications, it is necessary that many of this type of parallel signal be temporarily stored for subsequent entry into the computer and it is desirable that the reading and writing operations of the temporary storage be unsynchronized with respect to each other.

In accordance with the principles of this invention, these slow to be initiated signals are originated by conventional means such as push button or toggle switches which individually control the energizing circuit of their corresponding magnetic core. When a given switch is in the On position, the magnetic core controlled by that switch is caused to be magnetically saturated in one direction and when the switch is in the Off position, the magnetic core controlled by that switch is caused to be saturated in the opposite direction. The switches are logically grouped, each group being called a word. The cores are logically arranged in a two-dimensional array, each row of the array having its cores individually connected to a corresponding switch of a word group of switches. Successive rows of the core array are read out into the computer and this reading-out operation may occur simultaneously with the writing operation of the array.

Associated with each word group of switches is an additional switch referred to as an action switch and each of these action switches individually controls its corresponding magnetic core of a predetermined row of the magnetic core array. During normal operation, a word read from the array is meaningful only when the action switch corresponding to that word has been placed in the On position after the other switches have been placed in their On or Off condition in accordance with the word to be delivered to the computer.

It is an object of this invention to provide an improved signal storage equipment of the magnetic core type wherein reading operations and writing operations in the storage equipment may be asynchronous with respect to each other.

It is still another object of this invention to provide an improved signal storage equipment of the magnetic core type wherein groups of magnetic cores each have an individual magnetic core logically associated therewith whose state of saturation is controlled by a manually operated switch and the remanent magnetic state of a core associated with a given group of magnetic cores indicates whether or not the signals stored in that group of magnetic cores are meaningful.

It is a further object of this invention to provide an improved signal storage system wherein non-destructive readout storage means are provided to store certain of the stored signals and destructive read-out storage means are provided for certain other of the stored signals.

Other objects of the invention will be pointed out in the following description and claims and illustrated in the accompanying drawings which disclose, by way of example, the principle of the invention and the best mode, which has been contemplated, of applying that principle.

In the drawings:

Figs. 1A and 1B together form a schematic diagram, partly in block form, which illustrates a signal storage equipment constructed in accordance with the principles of this invention.

CONVENTIONS EMPLOYED

Figure 1A:
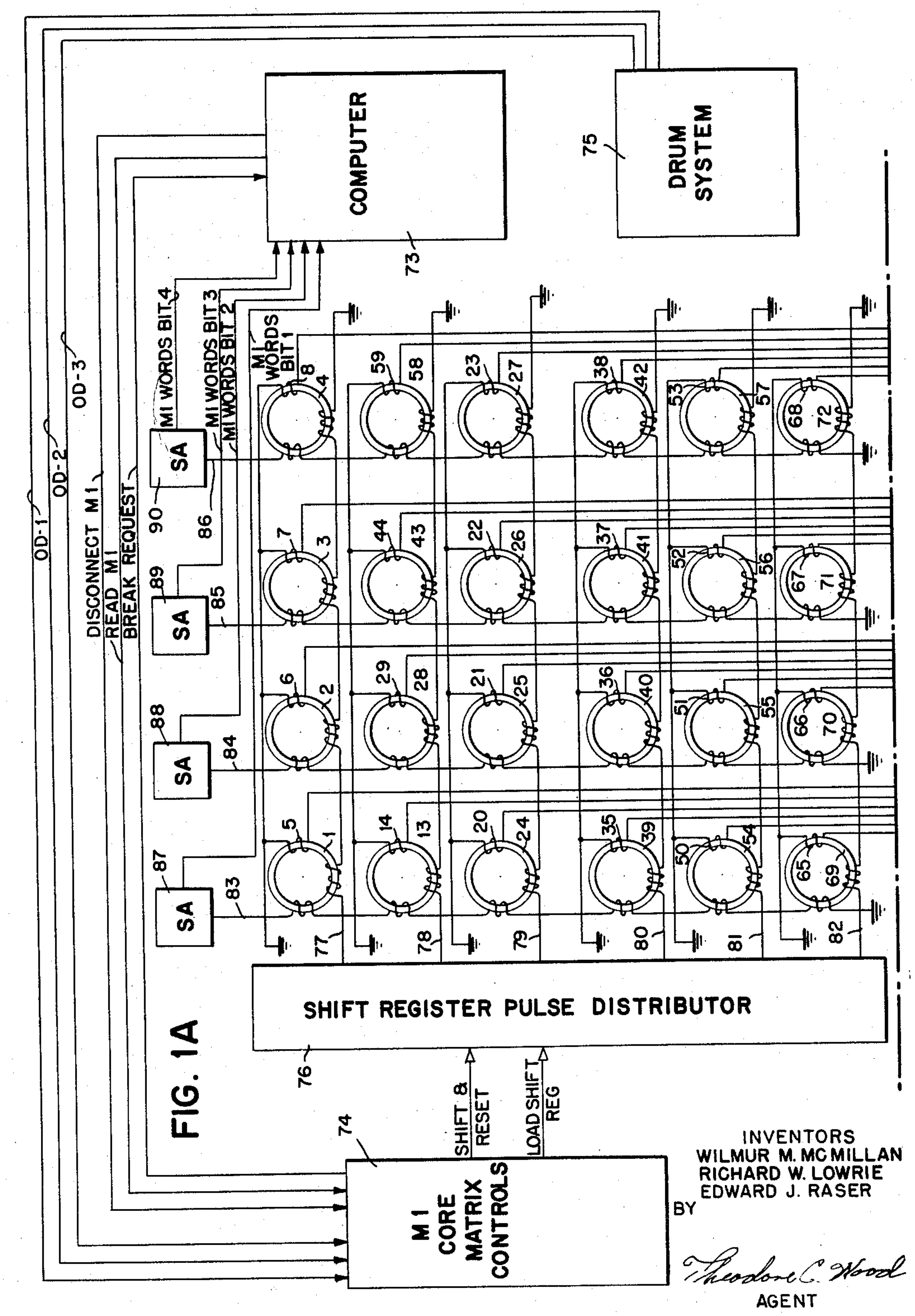

Throughout the following description and in the accompanying drawings there are certain conventions employed which are familiar to certain of those skilled in the art. Additional information concerning those conventions is as follows:

In the block diagram figures of the drawing, a conventional filled-in arrowhead is employed on lines throughout the drawing to indicate (1) a circuit connection, (2) energization with standard positive pulses, and (3) the direction of pulse travel which is also the direction of control. A conventional un-filled-in arrowhead is employed on lines throughout the drawing to indicate the same things indicated by a conventional filled-in arrowhead except that the un-filled-in arrowhead illustrates a non-standard pulse generally having a duration considerably longer than a standard pulse. A diamond-shaped arrowhead indicates (1) a circuit connection and (2) energization with a D.C. level. The D.C. levels are on the order of 10 volts when positive and 30 volts when negative, whereas standard pulses are $\frac{1}{10}$ $\mu$sec., half sine 20 to 40 volts and non-standard pulses are 20 to 40 volts and range in duration from 2.5 $\mu$sec. to 200 $\mu$sec. The input and output lines of the block symbols are connected to the most convenient side of the block except in the case of blocks representing flip-flops in which case inputs and outputs are on the bottom and top of the block, respectively, as viewed in the drawing.

Bold face character symbols appearing within a block symbol identify the common name for the circuit represented: FF identifies a flip-flop, GT a gate circuit, OR a logical OR circuit, and so forth. The character subscripts preceding bold face characters identify the model of the circuit identified by the bold face character, that is, $_B$FF identifies a model B flip-flop, and so forth.

In the description the general arrangement of the apparatus of a preferred embodiment of this invention will first be described with respect both to the manner in which the various circuit components and apparatus are interconnected and in respect to the general overall operation which is performed by these components and apparatus. The description of the general arrangement will be followed by separate and detailed descriptions of the various components and apparatus, which so require it, and each section of the description will have a heading which indicates the apparatus about to be described. The following is an index or table of contents of the description:

*Table of contents*

| | Column |
|---|---|
| General Arrangement | 3 |
| Pulse Write Circuits | 7 |
| D.C. Write Circuits | 7 |
| M1 Core Matrix Controls | 7 |
| Shift Register Pulse Distributor | 9 |
| Pulse Amplifier | 10 |
| Basic Circuits | 11 |

GENERAL ARRANGEMENT

Figure 1B:
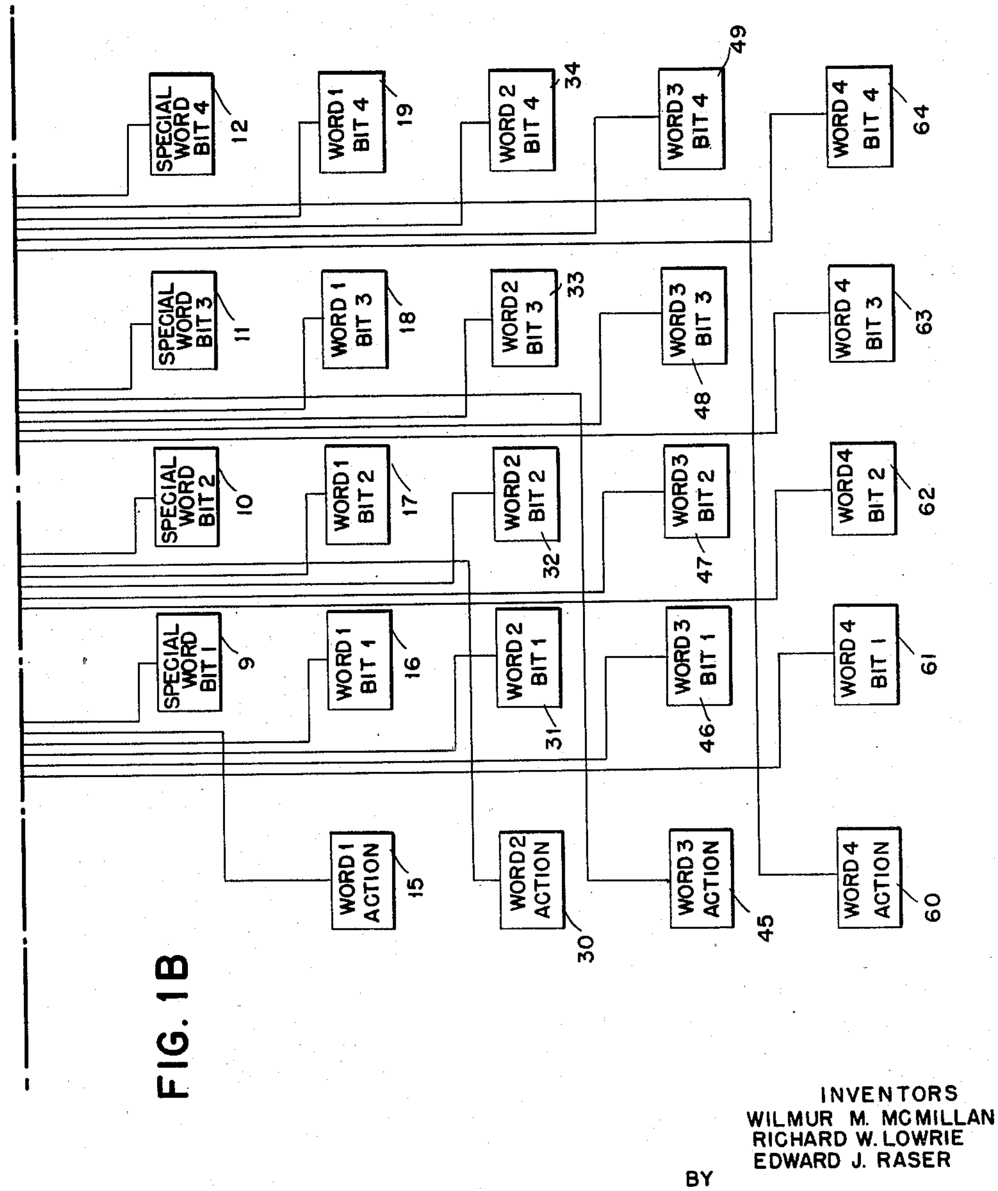

Referring now to Fig. 1, there is shown a first row of magnetic cores labeled 1 through 4. Although only four cores per row and only six rows of cores are shown in Fig. 1, it will be understood that the number of cores per row and the number of rows of cores will be determined by the particular application of this invention.

Energization of read-in windings 5 through 8 of cores 1 through 4 respectively is individually controlled by circuits 9 through 12 respectively.

Core 13 has its read-in winding 14 energized through a circuit 15 labeled Word 1 Action. Logically associated with Word 1 Action circuit 15 are circuits 16 through 19 labeled Word 1 Bit 1, Word 1 Bit 2, Word 1 Bit 3 and Word 1 Bit 4 respectively. Circuits 16 through 19 control the energization of read-in windings 20 through 23 respectively of cores 24 through 27 respectively.

Magnetic core 28 has its read-in winding 29 controlled by a circuit 30 labeled Word 2 Action. Logically associated with the Word 2 Action circuit 30 are circuits 31 through 34 which control the energization of read-in windings 35 through 38 respectively of magnetic cores 39 through 42 respectively.

Magnetic core 43 has the energization of its read-in winding 44 controlled by a circuit 45 labeled Word 3 Action. Logically associated with the Word 3 Action circuit 45 are circuits 46 through 49 labeled Word 3 Bit 1, Word 3 Bit 2, Word 3 Bit 3, and Word 3 Bit 4, respectively. Circuits 46 through 49 control the energization of read-in windings 50 through 53 respectively of cores 54 through 57, respectively.

Magnetic core 58 has the energization of its read-in winding 59 controlled by a circuit 60 labeled Word 4 Action. Logically associated with the Word 4 Action circuit 60 are circuits 61 through 64 labeled Word 4 Bit 1, Word 4 Bit 2, Word 4 Bit 3 and Word 4 Bit 4, respectively. Circuits 61 through 64 control the energization of read-in windings 65 through 68 respectively of cores 69 through 72, respectively.

Figures 2, 7:
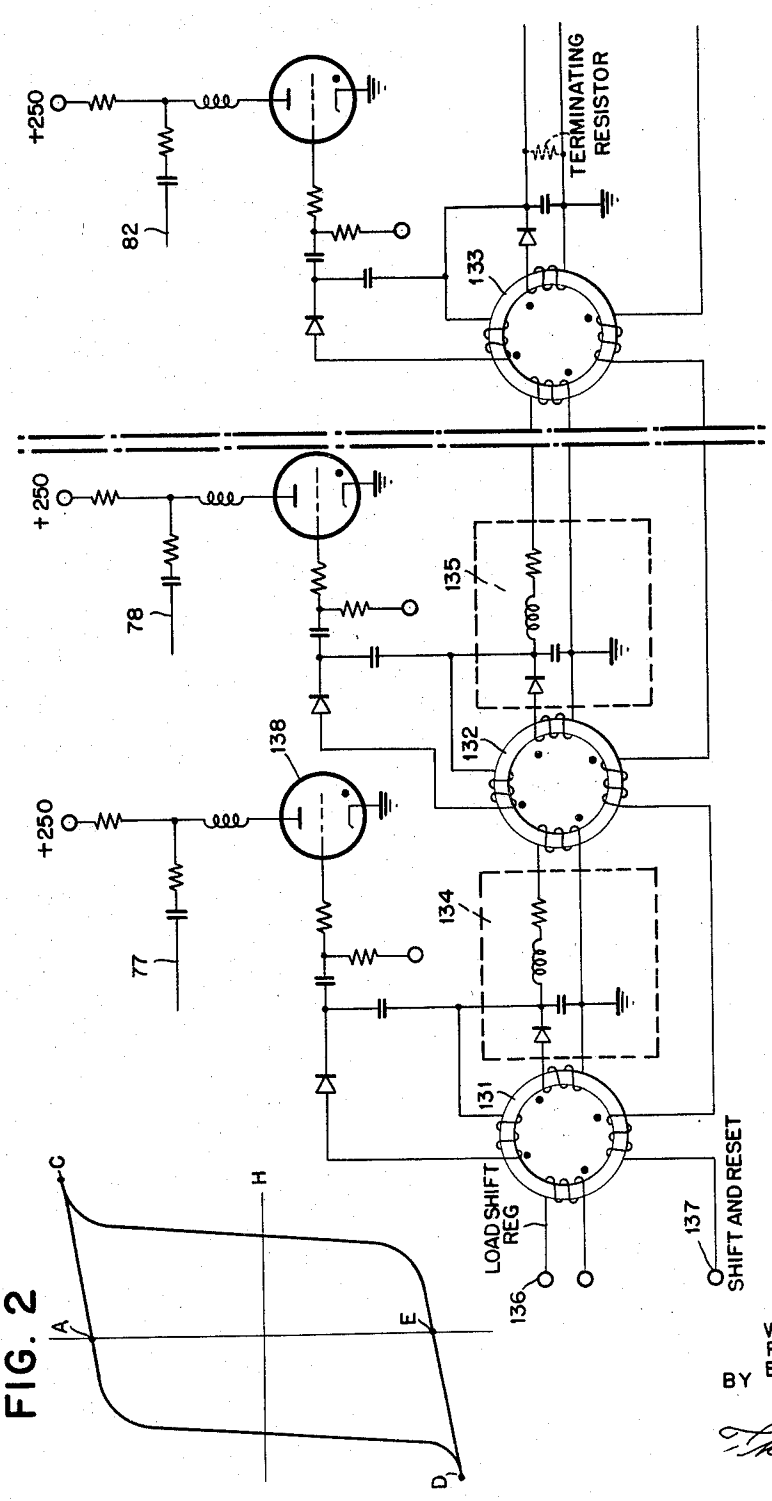
Fig. 2 is a curve illustrating the preferred hysteresis loop of the magnetic cores involved.
Fig. 7 is a schematic diagram illustrating the details of the Shift Register Pulse Distributor shown as a single block in Figs. 1A and 1B.

Referring now to Fig. 2, which illustrates an idealized hysteresis loop of commercially obtainable magnetic material, if the state of magnetization of a core of such material is that indicated at point A, application of a positive magnetomotive force greater than the coercive force causes the state of magnetization of the core to traverse the hysteresis curve to point C and, upon relaxation of this positive force, revert to point A. Application of a negative force greater than the coercive force causes the curve to be traversed to point D, and when the force is terminated, the state of magnetization will be traversed to point E. Similarly, when the remanence state of the core stands at point E, the application of a negative magnetomotive force causes the curve to be traversed to point D and returned to point E when the negative force is relaxed; while a positive force greater than the coercive force causes the traversal of the curve from point E to point C and return to point A when the positive force is terminated.

In the subsequent description two different types of writing operations of the magnetic cores will be referred to. The first of these types called "pulse write" operation is such that when a binary One is to be written into a core, a sufficient amount of current is momentarily applied to the read-in winding of the core to cause the hysteresis curve to be traversed to the point C in Fig. 2 and upon termination of the pulse, the curve is traversed to the point A and the core remains at this state until the read-out operation. The second type of writing operation, called "D.C. write" operation, is such that the read-in winding of the core is continuously energized with sufficient current to cause the state of magnetization of the core to be at point C in Fig. 2 when the core is storing a binary One and the read-in winding of the core is continuously energized with sufficient current to cause the state of magnetization of the core to be at point D when the core is storing a binary Zero.

The read-out operations of all of the cores in the subsequent description are accomplished by applying a read-out pulse to the read-out winding of the core. This read-out pulse is of sufficient magnitude to cause the curve of Fig. 2 to be traversed to the point D. If the magnetic state of the core was at point A or at point C when the read-out pulse was applied, a signal will be induced in the sense winding of the core. If the magnetic state of the core was at point D or E when the read-out pulse was applied, no appreciable signal will be induced in the sense winding of the core.

If the particular core being read out has a "pulse write" operation, then following the read-out pulse the hysteresis curve of Fig. 2 will be traversed to the point E and will remain there until the next write a One pulse is received. This is called "destructive read-out" since a stored binary One signal is destroyed by the read-out operation.

If the particular core being read out has a "D.C. write" operation then following the read-out operation the state of magnetization of the core will remain at point D in Fig. 2 if the core is storing a binary Zero. If the particular core having a "D.C. write" operation is storing a binary One, then following the read-out pulse the hysteresis curve of Fig. 2 will be traversed from point D to C. This is called "non-destructive read-out" since the information stored in the core is not destroyed by the read-out operation.

Referring back to Fig. 1, the special word circuits 9 through 12 and the action circuits 15, 30, 45 and 60 are so constructed as to cause "pulse write" operation in their respective cores whereas the Word 1 circuits 16 through 19, the Word 2 circuits 31 through 34, the Word 3 circuits 46 through 49 and the Word 4 circuits 61 through 64 are so constructed as to cause "D.C. write" operation.

Read-out operations of the various cores of the array are initiated and stopped by a computer 73. The computer 73 may be of conventional construction and may be that type known in the art as a stored program computer. In that type of computer, in response to a Read instruction of the stored program, the computer generates a pulse on a control conductor shown in Fig. 1 and labeled Read M1, and then, after a suitable length of time, generates a pulse on the conductor labeled Disconnect M1.

The conductor labeled Read M1 and the conductor labeled Disconnect M1 are connected to a circuit 74 labeled M1 Core Matrix Controls which also receives pulses from a Drum System 75 by way of conductors labeled OD1, OD2 and OD3.

Figure 3:
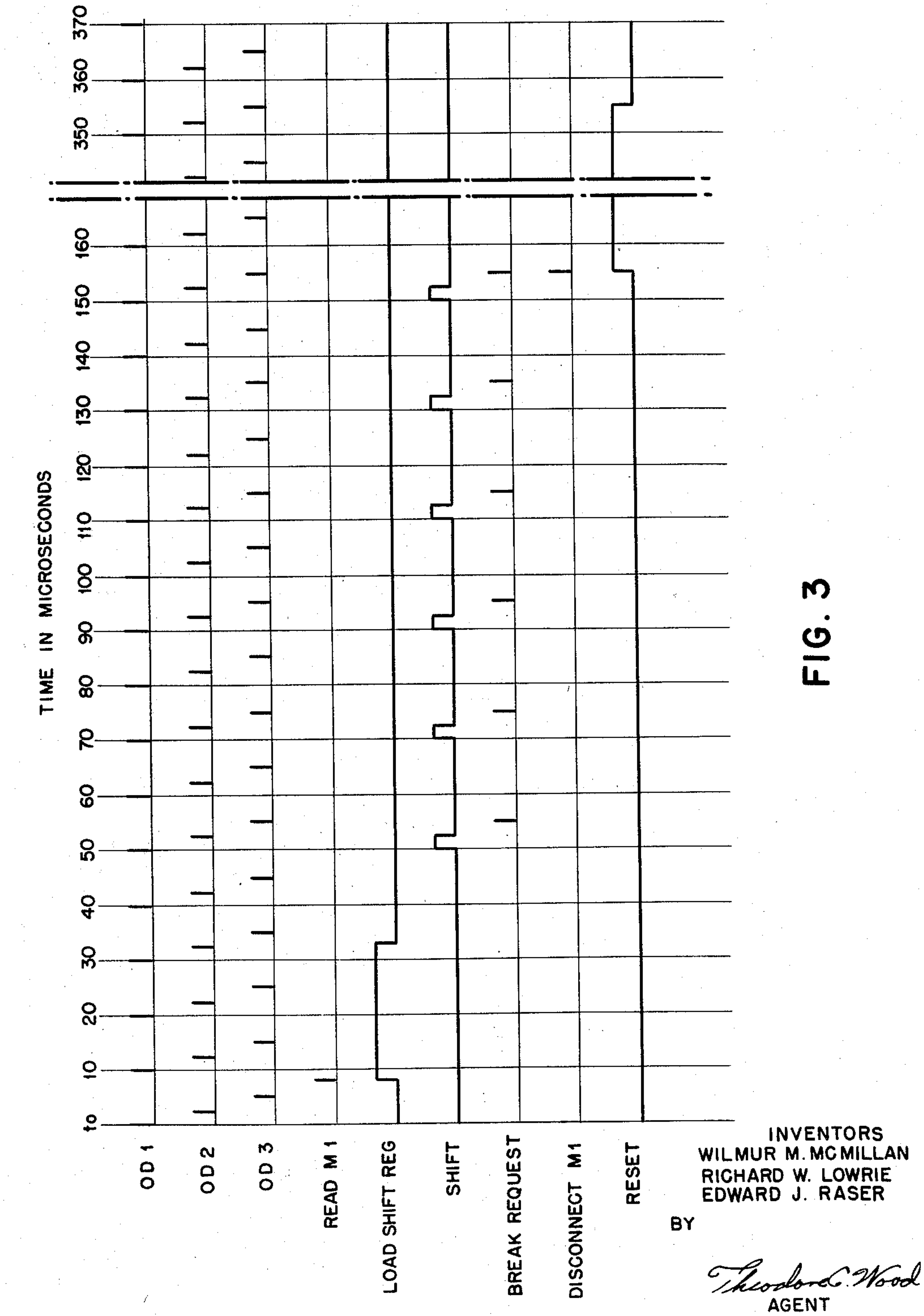
Fig. 3 is a chart illustrating the timing relationship of operations performed by the apparatus of Figs. 1A and 1B.

Reference is now made to Fig. 3 which illustrates the timing relationship between the OD timing pulses. These OD timing pulses are preferably .1 μsec. pulses occurring at a 10 μsec. rate. As shown in Fig. 3, the OD—1 timing pulses are spaced 10 μsec. apart and lead the OD—2 pulses by 2.5 μsec., whereas the OD—2 pulses lead the OD—3 pulses by 2.5 μsec. These OD timing pulses may be generated in any suitable way as, for example, in the manner shown and described in application Serial Number 494,982, entitled "Magnetic Data Storage," filed March 17, 1955, by Robert R. Everett et al.

A pulse on the conductor labeled Read M1 may occur at a random time with respect to the OD timing pulses; however, upon receipt of this Read M1 pulse, M1 Core Matrix Control circuit 75 generates the following pulses, the timing relationship of which is shown in Fig. 3:

(1) A 25 μsec. load shift register pulse on the conductor labeled Load Shift Register and this pulse begins substantially at the time of the Read M1 pulse;

(2) A succession of 2.5 μsec. shift pulses on the conductor labeled Shift and Reset, the first of which begins at the time of occurrence of the second OD—1 pulse following the time at which the trailing edge of the load shift register pulse occurred. The second and subsequent shift pulses of the series occur at 20 μsec. intervals following the first shift pulse.

(3) A succession of .1 μsec. pulses on the conductor labeled Break Request, the first of which occurs at the time of occurrence of the first CD—3 pulse following the second OD—1 pulse after the time of occurrence of the trailing edge of the load shift register pulse. The second and subsequent Break Request pulses occur at 20 μsec. intervals following the first Break Request pulse.

A pulse on the conductor labeled Disconnect M1 stops the M1 Core Matrix Control circuit 74 from generating any further Break Request pulses or Shift pulses and causes a 200 μsec. pulse to be delivered to the conductor labeled Shift and Reset.

Pulses on the conductor labeled Load Shift Register and the conductor labeled Shift and Reset are delivered to a Shift Register Pulse Distributor Circuit 76. The Shift Register Pulse Distributor Circuit 76, after receiving a Load Shift Register pulse, causes its output conductors 77 through 82 to be sequentially pulsed in response to the first through the sixth received shift pulses, respectively. A Reset pulse received on the conductor labeled Shift and Reset causes the Shift Register Pulse Distributor 76 to be cleared.

A pulse on the conductor 77 causes the read-out winding of each of the cores 1 through 4 to be energized sufficiently to drive all of those cores to their state of magnetization shown as point D in Fig. 2. Cores 1 through 4 have their sense windings connected to conductors 83 through 86, respectively, which in turn are connected to the inputs of Sense Amplifiers 87 through 90, respectively. When a pulse is received on the conductor 77, those cores of cores 1 to 4 which have received a Write pulse, subsequent to the last previously received pulse on conductor 77, will cause a pulse to be induced in their corresponding conductor of conductors 83 through 86.

The pulses produced by cores 1 through 4 are a result of the fact that when one of those cores receives a Write pulse, the core is caused to assume its stable state of remanence magnetization shown as point A in Fig. 2. When a read-out pulse is received, any of the cores 1 through 4 which are at that stable state, will be driven first to the magnetization point D and then to a new stable state shown at point E in Fig. 2. Any of those cores which had not received a Write pulse subsequent to the last previously received read-out pulse will be first driven to the magnetization point D and then back to the magnetization point E in response to read-out pulses. When a core is caused to traverse its magnetization curve from point A to point D and then to point E, this change in magnetization is sufficient to induce a pulse in its sense winding. A core which is caused to traverse its magnetization curve from point E to point D and back to point E will not induce an appreciable pulse in its sense winding.

A pulse on the conductor 78 causes read-out of the cores 13, 28, 43 and 58 in the same manner as that described with respect to cores 1 through 4.

A pulse on the conductor 79 causes read-out of the cores 24 through 27. As previously noted, cores 24 through 27 have "D.C. Write" operation, and therefore their read-out operation is different than cores 1 through 4. Any one of the cores 24 through 27 which is storing a binary One will be at its state of magnetization shown as point C in Fig. 2, whereas any of those cores storing a binary Zero will be at its state of magnetization shown as point D. When a pulse is received on the conductor 79, those cores of cores 24 through 27 which are storing a binary One will traverse their magnetization curve from point C, to point A, to point D, to point E and then back to point C. Those cores storing a binary One will be at their magnetization state shown as point D and will remain at substantially that same point during the read-out pulse. Those cores storing a binary One will therefore induce a pulse in their sense winding in response to a read-out pulse, whereas those cores storing a binary Zero will not.

Pulses on the conductors 80 through 82 will cause readout of their respective rows of cores in the same manner as that readout operation described with respect to cores 24 through 27.

Briefly summarizing the above described operation, at any desired time the computer can initiate the read-out operation of the core array by applying a pulse to the conductor labeled Read M1. In response to this Read M1 pulse the M1 Core Matrix control circuit starts sequentially reading the rows of the core array and this sequential reading continues until either all rows of the array have been read or until a pulse is delivered by the computer to the conductor labeled Disconnect M1.

At any desired time, any of the special word circuits 9 through 12 can cause a binary One to be written in their respective cores of the core array and those binary One's will be read out to the computer at the next time cores 1 through 4 receive a read-out pulse.

At any desired time, any of the Word 1 circuits 16 through 19 can cause a change in the signal stored in their respecttive cores of the array, that is, a stored binary One signal can be changed to a stored binary Zero or vice versa. Whenever a change of stored signal is made by any of the Word 1 circuits 16 through 19, those new signals and any unchanged signals of word 1 will be read out to the computer the next time cores 24 through 27 receive a read-out pulse. If the Word 1 bits 1 through 4 are now storing the binary number 1011 in the cores 24 through 27 and the circuits 16 through 19 are manually being changed to store a new binary number 0100, and assuming the operator is changing these bits from left to right and at a given instant during this change the cores are storing 0111, this means that only bits 1 and 2 have, as yet, been changed. If the computer is reading that particular row of cores at this given instant, then the word is not meaningful.

The Word 1 Action circuit and its corresponding core are provided to take care of this possibility. Although this word which is not meaningful is sent to the computer, it is effectively rejected. Before the computer effectively accepts any of the words 1 through 4, it must have read a binary One from the core written in by the Action circuit logically associated with that word, Therefore after a new word has been completely set in any one of the Word 1 through Word 4 circuits, the Action circuits 15, 30, 45 or 60 corresponding to that word is caused to write a binary One in its corresponding core. Since the Action circuits 15, 30, 45 and 60 cause "Pulse Write" operation, any of the Word 1 through Word 4 signals has an action signal that accompanies that word only one time that the word is read out.

"PULSE WRITE" CIRCUITS

Figures 4, 5:
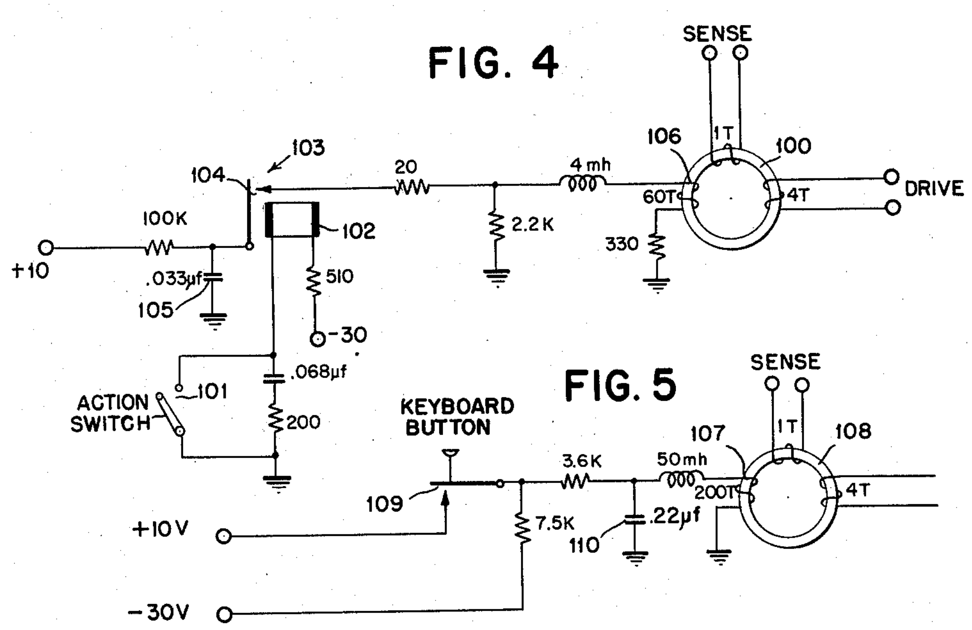
Fig. 4 is a schematic diagram illustrating the details of the "Pulse-Write" circuits of Figs. 1A and 1B.
Fig. 5 is a schematic diagram illustrating the details of the "D.C. Write" circuits of Figs. 1A and 1B.

Referring now to Fig. 4, each of the previously noted "Pulse Write" circuits may be of the construction shown in schematic form in that figure of the drawing. When it is desired to store a binary One in a magnetic core 100, a biased open action switch 101 is closed, thus energizing a winding 102 of a relay 103. When the winding 102 is energized, the relay 103 closes its contacts 104 completing an obvious discharge circuit for a capacitor 105 through a read-in winding 106 of core 100. The capacitor 105 is charged through an obvious circuit from a source of +10 volts. The discharge current from the capacitor 105 through the read-in winding 106 causes the core to traverse its hysteresis curve to the point C in Fig. 2. As the discharge current drops off, the magnetic state of the core will be at the point A, Fig. 2, which is representative of a binary One.

"D.C. WRITE" CIRCUITS

Referring now to Fig. 5, each of the previously noted "D.C. Write" circuits may be of the construction shown in schematic form in that figure of the drawing. A read-in winding 107 of core 108 is energized through an obvious circuit from a source of −30 volts and is also energized from a source of +10 volts when a switch 109 is in the closed position. Switch 109 is biased to remain in the position to which it has been moved. If the switch 109 is open, read-in winding 107 is energized with sufficient current to cause the core 108 to assume its magnetic state shown as point D in Fig. 2, whereas, if the switch is closed, the core assumes a magnetic state shown as point C in Fig. 2. The energizing circuit of read-in winding 107 of core 108 includes a capacitor 110 which together with the resistance of the energizing circuit of that winding forms an RC time constant to prevent the core 108 from being changed from one of its magnetic states to the other too rapidly. The value of this RC time constant is so chosen that the rate of change of magnetic state of the core is slow enough that negligible current is induced in the sense winding of the core when the switch 109 is changed from its open to its closed position or vice versa. Since changing the state of the core during a write operation does not induce any appreciable current into the sense winding, core 24 in Fig. 1, for example, can be written into while core 39, or any other core in that column of the array, is being read out of and the writing operation will not appreciably add to or subtract from the signal resulting from the reading operation. A magnetic core storage device wherein D.C. writing is employed in the manner above described to effect non-destructive readout of the information stored is claimed in copending application Serial No. 557,925, entitled "Magnetic Core Storage," filed January 9, 1956. That application is assigned to the assignee of the instant application.

M1 CORE MATRIX CONTROLS

Figure 6:
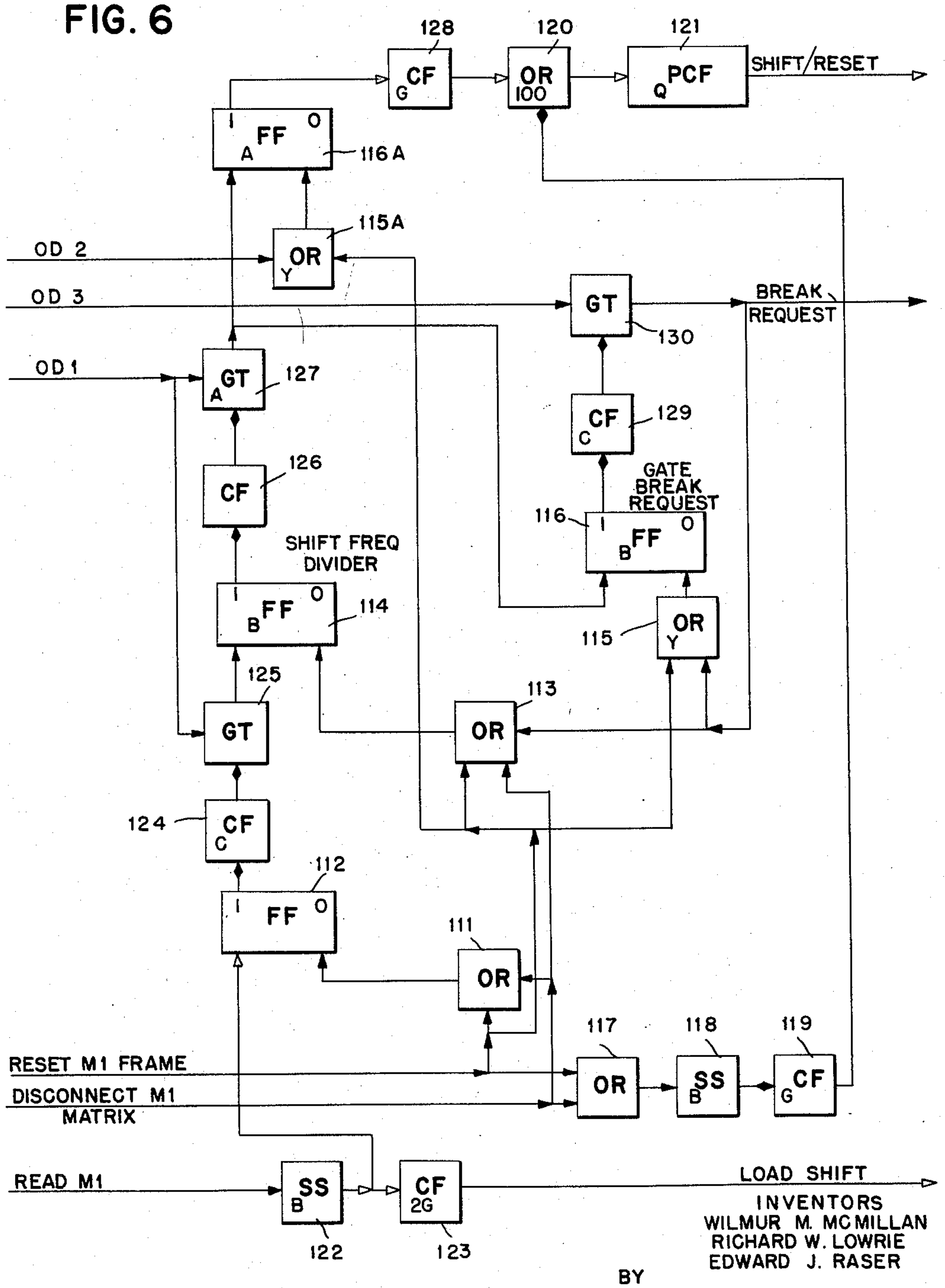
Fig. 6 is a Logical Block schematic diagram illustrating the details of the M1 Core Matrix Control circuit, shown as a single block in Figs. 1A and 1B.

Reference is now made to Fig. 6 which shows, in logical block schematic form, a preferred embodiment of the M1 Core Matrix Control Circuit shown as block 74 in Fig. 1.

To condition the control circuit 74 and the Shift Register Pulse Distributor 76 of Fig. 1 for automatic operation, a manually initiated pulse is applied to the conductor labeled Reset M1 (Fig. 6). This Reset pulse is applied through OR circuit 111 to the Zero input of a flip-flop 112, through an OR circuit 113 to the Zero input of a flip-flop 114, through an OR circuit 115 to the Zero input of another flip-flop 116 and through another OR circuit 115A to the Zero input of another flip-flop 116A. This Reset pulse is also applied through an OR circuit 117 to the input of a single-shot multivibrator 118 which, in response to this .1 μsec. pulse, generates a 200 μsec. pulse at its output. The output of the multivibrator 118 is applied through a cathode follower 119, an OR circuit 120 and another cathode follower 121 to the output conductor labeled Shift and Reset. This 200 μsec. pulse, as will be described subsequently, clears the Shift Register Pulse Distributor 76.

A .1 μsec. pulse on the conductor labeled Read M1 causes a Single Shot Multivibrator 122 to generate a 25 μsec. pulse at its output which is applied through a cathode follower 123 to the conductor labeled Load Shift Register. The output pulse from the Multivibrator 122 is also applied to the One input of the flip-flop 112. The flip-flop 112 is so constructed as to produce a positive D.C. level at its One output in response to the trailing edge of the positive pulse applied to its One input.

The 25 μsec. pulse on the conductor labeled Load Shift Register, as will be described subsequently, primes the Shift Register Pulse Distributor for subsequent operation.

A positive D.C. level from the One output of flip-flop 112, through a cathode follower 124 conditions a gate 125 to pass the next received pulse on the conductor labeled OD—1. Pulses passed by gate 125 are applied to the One input of flip-flop 114 to cause that flip-flop to produce a positive D.C. level at its One output. The positive D.C. level output of flip-flop 114, through a cathode follower 126, conditions a gate 127 to pass the next received OD—1 pulse.

Pulses passed by gate 127 are applied to the One input of flip-flop 116A and the One input of flip-flop 116 to causes both of those flip-flops to produce a positive D.C. level at their One outputs. Pulses on the conductor labeled OD—2 are applied through OR circuit 115A to the Zero input of flip-flop 116A to cause that flip-flop to produce a negative D.C. level on its One output. An OD—1 pulse passed by gate 127 therefore causes the flip-flop 116A to produce a positive output which lasts until the next OD—2 pulse. Since the OD—1 and OD—2 pulses are 2.5 μsec. apart, a 2.5 μsec. positive pulse is produced by flip-flop 116A which is applied through a cathode follower 128, OR circuit 120 and cathode follower 121 to the conductor labeled Shift and Reset. This 2.5 μsec. pulse is called the Shift pulse and, as will be described subsequently, causes the Load Shift Register pulse to be stepped through the Shift Register pulse distributor.

When the gate 127 has passed an OD—1 pulse, thus causing the flip-flop 116A to produce a 2.5 μsec. shift pulse, this same OD—1 pulse is applied to the One input of flip-flop 116 to cause that flip-flop to produce a positive D.C. level on its One output. This positive D.C. level, through a cathode follower 129, conditions a gate 130 to pass the next received OD—3 pulse. The OD—3 pulse which is passed by gate 130 is applied to the conductor labeled Break Request and is also applied through OR circuit 115 to the Zero input of flip-flop 116 and is further applied through OR circuit 113 to the Zero input of flip-flop 114.

Since the flip-flop is set to its Zero side by the OD—3 pulse, the next received OD—1 pulse will not be passed by gate 127 but will result in setting flip-flop 114 in its One state, thereby conditioning gate 127 to pass the next subsequent OD—1 pulse. This OD—1 pulse passed by gate 127 causes another 2.5 μsec. shift pulse to be generated by flip-flop 116A and also causes another Break Request pulse to be generated in the manner previously described.

As long as flip-flop 112 is in its One state, the 2.5 μsec. Shift pulses and Break Request pulses will be generated and those Shift pulses and Break Request pulses will be spaced 20 μsec. apart since they occur in response to every other OD—1 pulse and OD—1 pulses are 10 μsec. apart.

The generation of 2.5 μsec. Shift pulses and Break Request pulses can be stopped by manually initiating a pulse on the conductor labeled Reset M1 or by the computer 73 (Fig. 1) applying a pulse to the conductor labeled Disconnect M1. A pulse on the conductor labeled Disconnect M1 is applied through OR circuits 111 and 113 to the Zero inputs of flip-flops 112 and 114 respectively, and is also applied through Or circuit 117 to Multivibrator 118 to cause a Reset pulse to be generated in the manner previously described.

SHIFT REGISTER PULSE DISTRIBUTOR

Reference is made to Fig. 7 which illustrates in schematic form a preferred embodiment of the Shift Register Pulse Distributor shown as block 76 in Fig. 1.

The magnetic core shift register includes cores 131, 132 and 133. In the interest of simplifying the drawing and description, only three stages of the core shift register are shown in Fig. 7, and a break line has been shown between stages 2 and 3 to indicate that other stages may be inserted. Since the illustrated embodiment of this invention has been shown to have six output conductors of the Shift Register Pulse Distributor, it will be understood that the number of stages in the core shift register would correspondingly be six.

The magnetic cores 131, 132 and 133 are interconnected by transfer circuits 134 and 135. The Load Shift Register pulses generated by the M1 Core Matrix Control Circuit 74 (Fig. 1 and Fig. 6) are applied to the input terminal 136 (Fig. 7). This Load Shift Register pulse causes the core 131 to be set in its remanence state representative of a binary One at the termination of the pulse. As previously described, this Load Shift Register pulse in the illustrated embodiment is 25 μsec. in duration; it will be understood however, that this pulse need be only of sufficient duration to insure that a binary One is stored in core 131.

The pulses on the conductor labeled Shift and Reset from the M1 Core Matrix Control Circuit 74 (Fig. 1 and Fig. 6) are applied to the input terminal 137 (Fig. 7).

A Shift pulse (2.5 μsec.) on the Shift and Reset conductor will cause a binary One stored in core 131 to be transferred to core 132 and this transfer signal also produces sufficient voltage at the control grid of thyratron 138 to cause that tube to conduct. When thyratron 138 conducts, current flows through the conductor 77 which is connected to the read-out windings of cores 1 through 4 (Fig. 1). Due to the 1 megohm resistor 139 and the capacitor 140, thyratron 138 ceases to conduct after a brief interval of time (sufficient to read out cores 1 through 4). The thyratron 138 produces a current pulse in conductor 77 sufficient to cause read-out of many cores in the row of the array that it is associated with and although only 4 cores are shown in a row of the array, the rows may have as many as 32 cores and the thyratron will produce enough current to cause satisfactory read-out operation.

The binary One stored in core 132 is transferred to the core of the succeeding stage in response to a Shift pulse and this transferred signal causes thyratron 141 to be fired, supplying current to conductor 78 in the same manner as that described with respect to thyratron 138.

A binary One stored in core 133 causes voltage to be induced in windings 142, 143 when a Shift pulse is received and this voltage causes thyratron 144 to be fired, supplying current to conductor 82 in the same manner as that described with respect to thyratron 138. It should be noted that a binary One stored in core 133 is not transferred to any other core but in response to the Shift pulse this binary One causes the thyratron 144 to be fired.

If a Reset pulse (200 μsec. in duration) is applied to terminal 137, a binary One stored in any core of the shift register will not be transferred to a subsequent core because the signal transferred, although attempting to write a binary One in the subsequent core, will not do so since at that time the shift winding is being energized by a current which produces a flux in the core in the opposite direction. Although the Reset pulse in the illustrated embodiment has been shown as 200 μsec. in duration, it will be understood that the pulse need be only long enough to insure that a binary One stored in the core is not transferred to the subsequent core. The rise time of the Reset pulse is slow enough so that the voltage induced in the output windings will not fire a thyratron.

From the above description it will be seen that if a Reset pulse is applied to the terminal 137, followed by a Load Shift Register pulse applied to the terminal 136, then each Shift pulse applied to terminal 137 will advance the binary One from one stage to the next. In response to the first shift pulse, conductor 77 will receive current; in response to the second shift pulse, conductor 78 will receive current, etc., until the shift pulses cease or until the binary One state has been read out of core 133, thus supplying current to conductor 82.

SENSE AMPLIFIER

Figure 8:
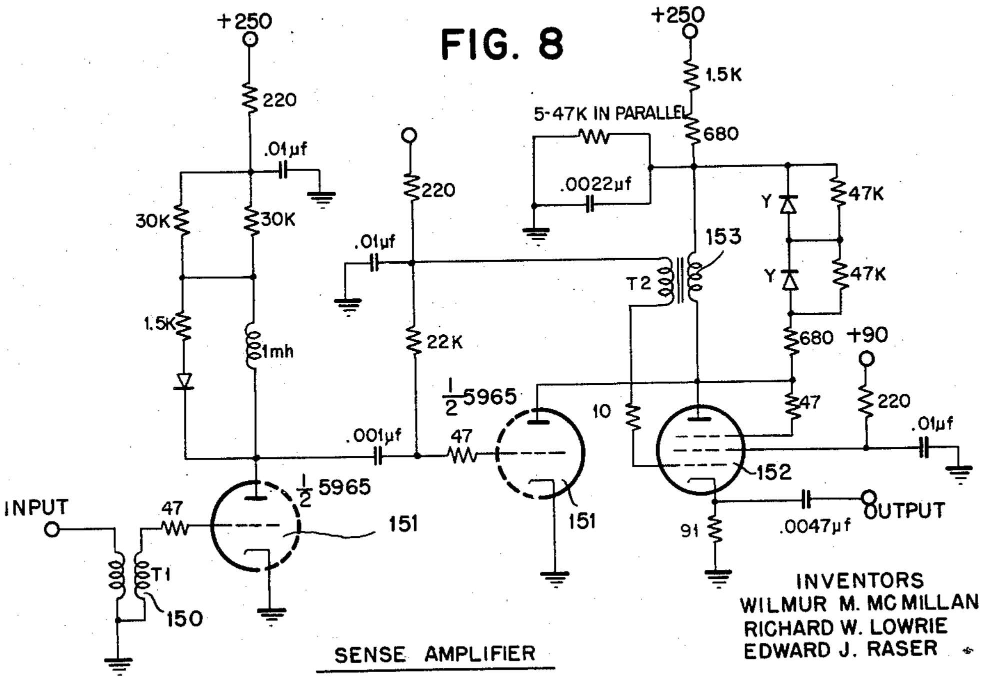
Fig. 8 is a schematic diagram illustrating the details of the Sense Amplifier shown as blocks 87 through 90 in Fig. 1A.

Reference is now made to Fig. 8, which illustrates in schematic form a preferred embodiment of any one of the Sense Amplifiers shown as blocks 87 through 90 in Fig. 1.

The signal induced in the serially connected sense windings of a column of cores of the array is coupled through a transformer 150 to the grid of the first section of a twin triode tube 151. This first triode section is normally conducting and is made non-conducting in response to a signal representative of a binary One, induced in any one of the sense windings of the cores in that column of the array. This signal results in a rise in anode potential of the first section of the tube 151. This rise in anode potential is RC coupled to the grid of the second triode section of tube 151.

This second triode section of tube 151 is normally non-conducting and is made conducting in response to the signal. Vacuum tube 152 and its associate circuit form a blocking oscillator circuit which is triggered in a manner that is termed in the art as "plate pull-over," that is, the anode of the second triode section of tube 151 is directly connected to the anode of tube 152 which is normally non-conducting. When the second triode section of tube 151 is made conducting, the anode potential of tube 152 is lowered as a result of increase in current flow through the primary winding of a transformer 153. This increase in current in the primary winding of transformer 153 induces a voltage in the secondary winding of that transformer of such polarity as to raise the potential of the control grid of tube 152, making that tube conduct, further increasing the change in current in the primary winding of transformer 153.

When the condition is reached that no further increase in current in the primary of transformer 153 occurs, no voltage will be induced in the secondary winding. The potential on the grid of tube 152 will start to decrease toward −30 v. This decrease in grid voltage will cause the anode potential of tube 152 to rise as a result of decrease in current flow through the primary winding of transformer 153. The decrease in current in the primary induces a voltage in the secondary winding of such polarity as to further decrease the potential of the control grid of tube 152.

The output of the Sense Amplifier is taken from the cathode of tube 152. Briefly summarizing the above described operation of the Sense Amplifier, a signal representative of a binary One applied through transformer 150 to the grid of the first section of tube 151 will result in a positive signal of very short duration (.1 μsec. in the illustrated embodiment) to be applied to the output of the Sense Amplifier.

BASIC CIRCUITS

The flip-flop shown in Fig. 6 as block 112 may be such as that shown in Fig. 8 of copending patent application Serial Number 502,634 entitled "Counter Circuit," filed Apr. 20, 1955, by Hawley K. Rising et al.

The B Model flip-flops shown in Fig. 6 as blocks labeled $_B$FF may be such as that shown in Fig. 1 of copending patent application Serial Number 473,874, entitled "Electronic Ring Circuit," filed Dec. 8, 1954, by Raymond E. Nienburg.

The gate circuits shown in Fig. 6 as blocks labeled GT may be such as that shown in Fig. 46 of copending patent application Serial Number 471,002, entitled "Electronic Data Processing Machine," filed November 24, 1954, by Harold D. Ross et al.

The OR circuits shown in Fig. 6 as blocks labeled OR may be such as that shown in Fig. 50 of the above mentioned copending application Serial Number 471,002.

The Single Shot Multivibrators shown in Fig. 6 as blocks labeled SS may be such as that shown in copending patent application Serial Number 474,346, entitled "Monostable Multivibrator," filed December 10, 1954, by William L. Jackman.

The flip-flop shown in Fig. 6 as the block labeled $_A$FF may be such as that shown in Fig. 45 of the above mentioned copending application Serial Number 471,002.

The various cathode followers shown in Fig. 6 labeled CF and PCF with various preceding subscripts identifying the particular model, may be such as those shown in Figs. 49 and 57 through 60 of the above mentioned copending application Serial Number 471,002. It will be understood that the type of cathode follower to be employed in a given circuit will largely depend upon the power considerations of the source and load of that circuit and the length of conductors between the source and the load. One skilled in the art will select the proper cathode follower circuit for the particular application involved.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. A magnetic core storage system comprising; a plurality of magnetic core registers wherein each core has substantially a rectangular hysteresis loop characteristic, each order of each of said registers being independently biassed so as to store information by either of its magnetic saturation states, and such states are independent of each other an individual magnetic core for each of said magnetic core registers, each of said individual magnetic cores being capable of storing information by its remanence magnetic state; and means to simultaneously deliver the information signals stored in said individual magnetic cores and said plurality of magnetic core registers to a common utilization device, whereby such simultaneous delivery results in a destructive read-out of an individual core in its remanent state, but a non-destructive read-out of the biassed cores.

2. A magnetic core storage system wherein writing operations may be asynchronous with respect to reading operations comprising; a plurality of magnetic core registers, each register having a plurality of bistable magnetic cores; means to cause certain of said magnetic cores to be continuously magnetically saturated in either of its two saturation states and such saturated states are independent of one another; means to cause certain others of said magnetic cores to be energized to their remanence magnetic states, and means to sequentially read-out said magnetic core registers by momentarily energizing all the cores of a given register and thereby causing the cores in their remanent states to be destructively read out and the saturated cores to be non-destructively read out.

3. A plurality of magnetic cores, each of said cores having a first winding and a second winding, means to energize said first winding of one of said cores with a pulse signal to thereby cause said core to assume a remanence magnetic state in one sense, means to selectively energize said first winding of each of the other of said cores with a steady state signal to thereby cause selected ones of the other of said cores to attain a state of saturation in one sense to represent information, and means for momentarily energizing said second windings of all of said cores to cause said cores to attain a flux state in an opposite sense and ascertain the condition of said cores whereby the remanent cores are read out destructively and the saturated cores are read out non-destructively.

4. A magnetic core system comprising an array of cores, a plurality of magnetic cores in said array, means to energize said cores such that each of said cores is either positively or negatively magnetically saturated to represent the binary state of each core, and the saturated state of one core is independent of the saturated state of any other core in the array, another magnetic core in said array and having a substantially square hysteresis loop characteristic, such other core storing information to indicate the manner of using the information in said array of cores, means to momentarily energize said other magnetic core such that after said momentary energization such other magnetic core assumes a predetermined remanent state of magnetization while said plurality of magnetic cores remain in their respective magnetically saturated states, means to simultaneously energize all of said cores so as to drive them toward the same predetermined magnetic saturation state, whereby upon the termination of said simultaneous energizing means the information in said other magnetic core is destroyed but the information in said plurality of cores is retained.

5. A magnetic core system comprising a plurality of magnetic cores each of which has a substantially rectangular hysteresis characteristic, means to continuously energize said cores such that each of said cores is magnetically saturated in either of its two states of saturation and such states are independent of each other, another bistable magnetic core, means to momentarily energize said another core such that after said momentary energization it assumes a predetermined significant remanence condition while said other cores remain magnetically saturated, means to simultaneously energize said plurality of magnetic cores and said another magnetic core such that all of said cores are momentarily magnetically saturated in a predetermined direction.

6. The magnetic core storage system as defined in claim 5 including means responsive to changes in magnetic states of said plurality of magnetic cores and said another magnetic core.

References Cited in the file of this patent

UNITED STATES PATENTS

| | | |
|---|---|---|
| 2,654,080 | Browne | Sept. 29, 1953 |
| 2,714,843 | Hooven | Aug. 9, 1955 |
| 2,734,182 | Rajchman | Feb. 7, 1956 |
| 2,734,184 | Rajchman | Feb. 7, 1956 |
| 2,768,367 | Rajchman | Oct. 23, 1956 |

OTHER REFERENCES

"The Non-Destructive Read-Out of Magnetic Cores," by A. Papoulis, Proceedings of the I-R-E, pp. 1283–1287, August 1954.